(12) United States Patent
Chaffee

(10) Patent No.: US 7,662,277 B1
(45) Date of Patent: Feb. 16, 2010

(54) WASTEWATER TREATMENT APPARATUS

(76) Inventor: Kevin R Chaffee, 1037 S. Park Acres Dr., Batesville, IN (US) 47006

( * ) Notice: Subject to any disclaimer, the term of this patent is extended or adjusted under 35 U.S.C. 154(b) by 771 days.

(21) Appl. No.: 11/415,238

(22) Filed: May 1, 2006

Related U.S. Application Data

(60) Provisional application No. 60/676,501, filed on Apr. 29, 2005, provisional application No. 60/676,489, filed on Apr. 29, 2005.

(51) Int. Cl.
C02F 3/04 (2006.01)
(52) U.S. Cl. .................. 210/86; 210/138; 210/170.08; 210/109; 210/196; 210/197
(58) Field of Classification Search .................. 210/86, 210/138, 170.08, 196, 197, 206
See application file for complete search history.

(56) References Cited

U.S. PATENT DOCUMENTS

| 848,279 | A | 3/1907 | Ashley |
| 2,366,917 | A | 1/1945 | Levine |
| 2,817,956 | A | 12/1957 | Young |
| 3,123,555 | A | 3/1964 | Moore |
| 3,126,333 | A | 3/1964 | Williams |
| 3,825,119 | A | 7/1974 | Rost |
| 3,933,641 | A | 1/1976 | Hadden et al. |
| 3,957,642 | A | 5/1976 | Oldham et al. |
| 4,100,070 | A | 7/1978 | White et al. |
| 4,251,359 | A | 2/1981 | Colwell et al. |
| 4,750,999 | A | 6/1988 | Roberts et al. |
| 4,812,237 | A | 3/1989 | Cawley et al. |
| 4,824,287 | A | 4/1989 | Tracy |
| 4,830,757 | A | 5/1989 | Lynch et al. |
| 5,132,599 | A | 7/1992 | Kono et al. |
| 5,240,611 | A | 8/1993 | Burton |
| 5,277,814 | A | 1/1994 | Winter et al. |
| 5,480,561 | A | 1/1996 | Ball et al. |
| 5,531,894 | A | 7/1996 | Ball et al. |
| 5,554,281 | A | 9/1996 | McDougald |
| 5,597,477 | A | 1/1997 | Harry, III |
| 5,609,754 | A | 3/1997 | Stuth |
| 5,645,725 | A | 7/1997 | Zitzelsberger et al. |
| 5,690,827 | A | 11/1997 | Simmering et al. |
| 5,707,513 | A | 1/1998 | Jowett et al. |
| 6,132,599 | A | 10/2000 | Chaffee |
| 6,464,865 | B2 | 10/2002 | Tipton et al. |
| 6,485,647 | B1 | 11/2002 | Potts |
| 6,616,832 | B1 | 9/2003 | Chaffee |
| 6,974,536 | B2 | 12/2005 | Chaffee |
| 2003/0141229 | A1 | 7/2003 | Chaffee |
| 2004/0265061 | A1 | 12/2004 | Chaffee |

FOREIGN PATENT DOCUMENTS

JP 61-101297 5/1986
WO WO 0067876 A1 * 11/2000

* cited by examiner

Primary Examiner—Terry K Cecil
(74) Attorney, Agent, or Firm—Innovation Law Office of Dennis Schell

(57) ABSTRACT

An improved wastewater treatment apparatus is provided. The waste treatment apparatus illustratively follows a primary treatment system such as, for example, a septic tank, a primary clarifier, a lagoon, or an activated sludge process.

19 Claims, 7 Drawing Sheets

WASTEWATER TREATMENT APPARATUS

CROSS REFERENCE TO RELATED APPLICATIONS

This application claims the benefit of U.S. Provisional Application Ser. Nos. 60/676,501 and 60/676,489, both filed on Apr. 29, 2005, which are expressly incorporated by reference herein.

BACKGROUND AND SUMMARY OF THE INVENTION

The present invention relates to wastewater treatment systems and improvements thereto. U.S. Pat. Nos. 6,132,599 and 6,974,536 and PCT International Publication No. WO 00/67876 are expressly incorporated by reference herein.

The illustrated waste treatment apparatus is a pre-packaged, attached-growth packed bed filter that contains the components of the technology in a single container. The system is designed to be installed in an excavation, connected to inlet and outlet piping, provided with power, and to begin operating. The system produces the high-quality effluent of a sand filter, and retains the simplicity of operation and maintenance of the recirculating sand filter, but reduces overall construction time and cost significantly.

The illustrated waste treatment apparatus uses a proprietary textile chip media that has a very large surface area for attachment of microorganisms, and very high porosity for natural aeration. The tank is illustratively constructed of precast concrete, fiberglass or other suitable material. Alternatively, larger units can be cast-in-place concrete or constructed on-site using precast concrete panels. Smaller systems resemble septic tanks and are installed in the same manner.

The illustrated waste treatment apparatus follows a primary treatment system that removes excess biochemical oxygen demand (BOD), settleable solids, scum, and FOG. The primary treatment system may include a septic tank, primary clarifier, lagoon, or an activated sludge process. For subdivisions and community systems, a septic tank effluent collection system (STEP or STEG) provides both cost-effective collection and primary treatment.

Incoming wastewater is illustratively stored in the bottom of the tank in a recirculation chamber below the filter bed underdrain. Treated wastewater from the filter falls through a porous underdrain and mixes with the incoming wastewater in the recirculation chamber. The system is designed so that a certain percentage of the filtered effluent is directed back into the recirculation basin, and a portion of the treated effluent is directed to discharge, which determines the recirculation ratio.

The wastewater in the recirculation chamber is directed to internal submersible pumps and is distributed across the filter bed using a series of fixed spray nozzles. The spray nozzles uniformly distribute the wastewater over the filter bed and provide aeration of the wastewater. The entire structure is illustratively installed below grade with only the air vents and control panels showing above ground. Since the entire system is below grade, the wastewater temperature stays uniform throughout the year, which provides better microbial treatment.

In one illustrated embodiment, the portion of the treated effluent not directed back to the recirculation chamber is stored in an internal treated effluent dosing chamber. Internal submersible pumps discharge the treated effluent from the dosing chamber to final disposal, or optionally, back to the primary treatment system for additional recirculation. The dosing pumps may be programmed to provide timed dosing or may operate based on water levels in the tank. When using subsurface wastewater disposal, an additional pump station is typically not required for pressure dosing, thereby reducing overall system costs.

In another illustrated embodiment, the portion of the treated effluent that is not directed back to the recirculation chamber is filtered by a filter media in a dosing chamber and then removed from the dosing chamber through a perforated discharge tube or sloped underdrain collection area for final disposal. In this embodiment a solid slab or floor located beneath the dosing chamber discharge tube prevents treated wastewater from the dosing chamber from returning to the recirculation chamber.

Additional features of the invention will become apparent to those skilled in the art upon consideration of the following detailed description of the presently perceived best mode of carrying out the invention.

BRIEF DESCRIPTION OF THE DRAWINGS

The detailed description particularly refers to the accompanying figures in which.

DETAILED DESCRIPTION OF THE DRAWINGS

Figure 1:
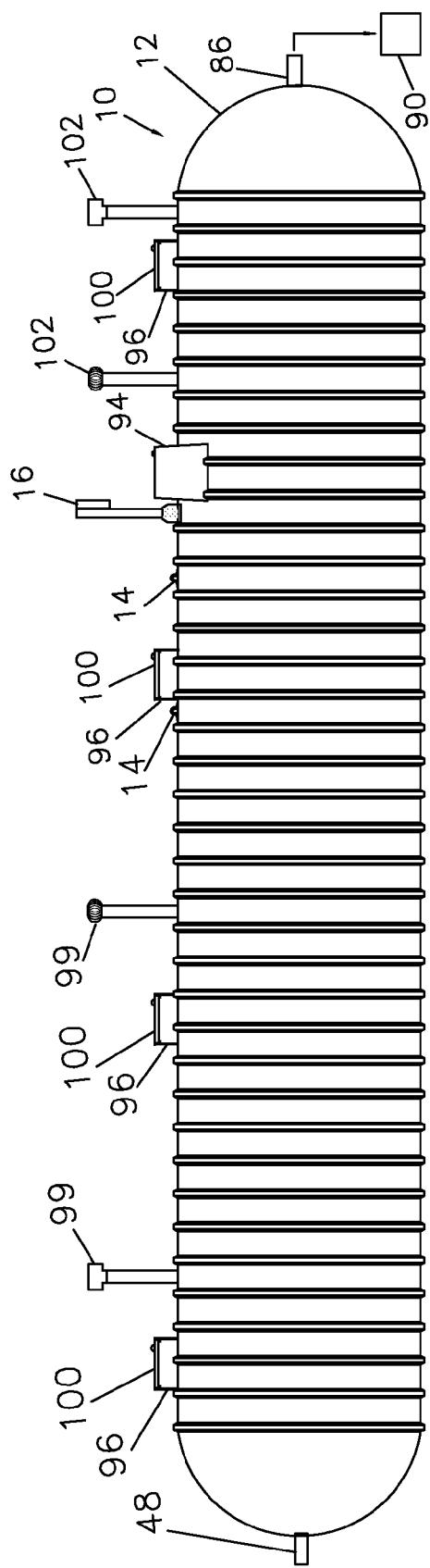
FIG. 1 is a side elevational view of a wastewater treatment apparatus of the present invention.
Figure 2:
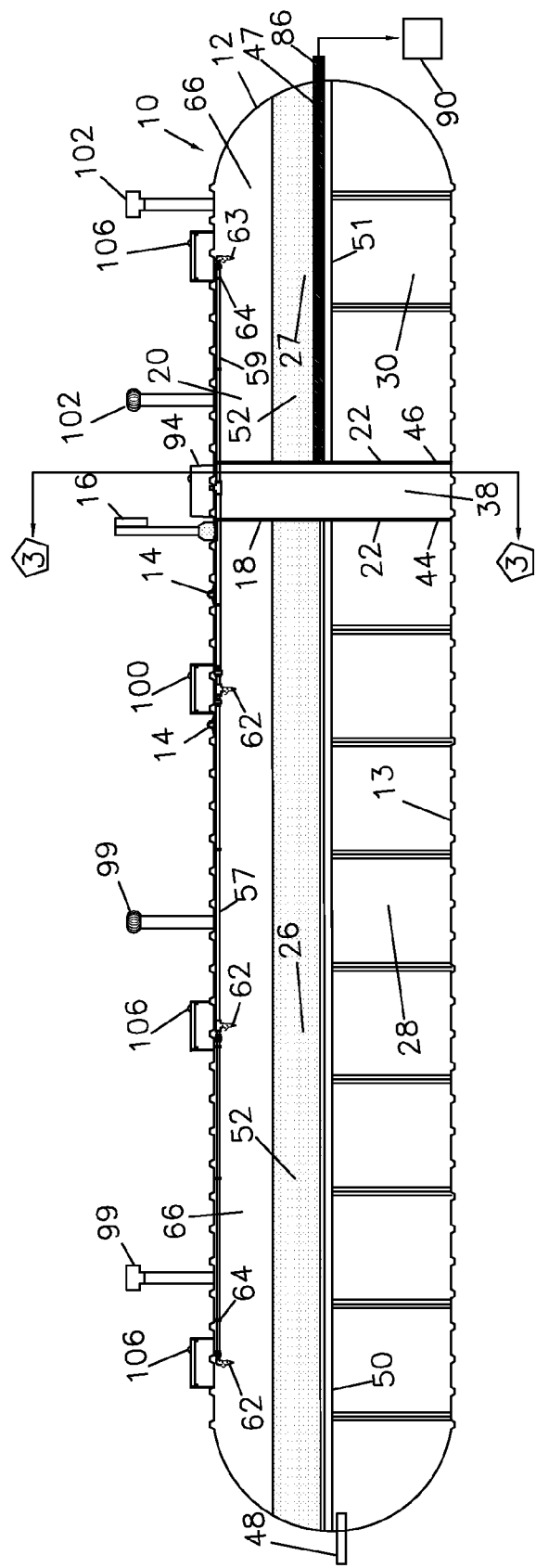
FIG. 2 is a sectional view taken through the apparatus of FIG. 1.

Referring now to the drawings, FIGS. 1 and 2 illustrate a wastewater treatment apparatus 10 including a tank 12. Tank 12 includes a pair of tank lifting lugs 14 to facilitate movement of tank 12 and placement of the tank 12 within the ground during installation. A control panel 16 extends upwardly from the tank 12 so that control panel 16 is located above ground.

Figure 3:
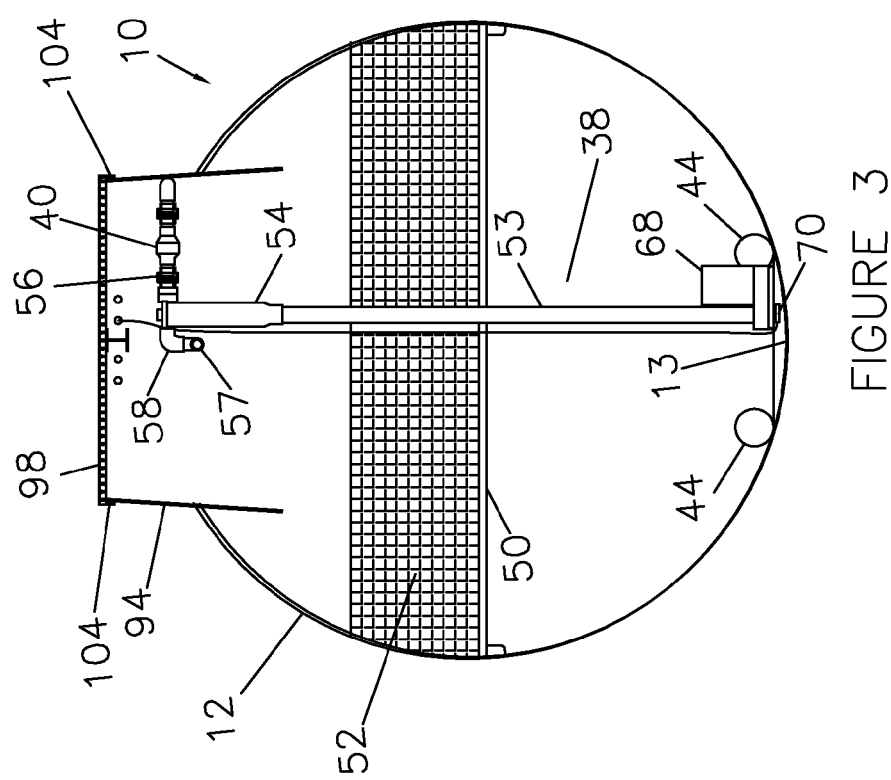
FIG. 3 is a sectional view taken along lines 3-3 of FIG. 2 illustrating a pump section of the apparatus.

As best shown in FIGS. 2 and 3, the tank 12 includes a pump section 18, a filter section 20 and a recirculation chamber 28. A first portion of the interior region of tank 12 is divided top-to-bottom by a porous filter underdrain layer 50 which supports a filter media 52 of a recirculation filter layer 26 above the recirculation chamber 28. A pair of spaced apart pump walls 22 define the pump section 18. Openings or conduits 44 and 46 permit flow of wastewater between the recirculation chamber 28 on opposite sides of pump walls 22 and the pump section 18.

A solid underdrain 51 provides a dosing filter floor on an opposite side of pump section 18 from the porous recirculation filter underdrain 50. A dosing filter layer 27 is located on the solid underdrain or floor 51. Dosing filter layer 27 is illustratively formed by filter media 52. A perforated or porous influent collection pipe 47 is located on the filter floor 51. The collection pipe 47 collects treated wastewater from the dosing region above floor 51 and directs the wastewater out of the tank 12 through a discharge pipe 86 to a discharge system 90 as discussed below. Alternatively, the filter floor 51 is sloped to drain to discharge pipe 86 to a discharge system 90 without the use of collection pipe 47.

Settled and screened wastewater from a septic tank or other primary treatment device enters the wastewater treatment apparatus 10 through an influent pipe 48. The influent mixes with treated water falling from the porous filter underdrain 50 and is stored in a recirculation chamber 28. The mixture of influent wastewater and treated effluent flows through the recirculation conduits 44 and 46 formed in the walls 22 of pump section 18 into a recirculation pump chamber 38. A pair of recirculation pumps 68 shown in FIGS. 3 and 4 (not shown in FIG. 2) are used to pump the wastewater through recirculation pump filters 54 through pipes 53 as shown in FIG. 3. The recirculation pump filter 54 is illustratively a pressure rated filter with a stainless steel slotted screen that captures debris and keeps the spray nozzles 62 from plugging. A preferred recirculation pump filter is a model STF-100 filter from GAG Sim/Tech located in Boyne City, Mich.

Each of the filters 54 is coupled through a union 56 to a check valve 40. Check valves 40 permit wastewater to flow only in the direction of arrow 41 in FIG. 4. Check valves 40 are each coupled by pipes 41 to a flow switch 43 connected to a single filter distribution pipe 50.

Figure 4:
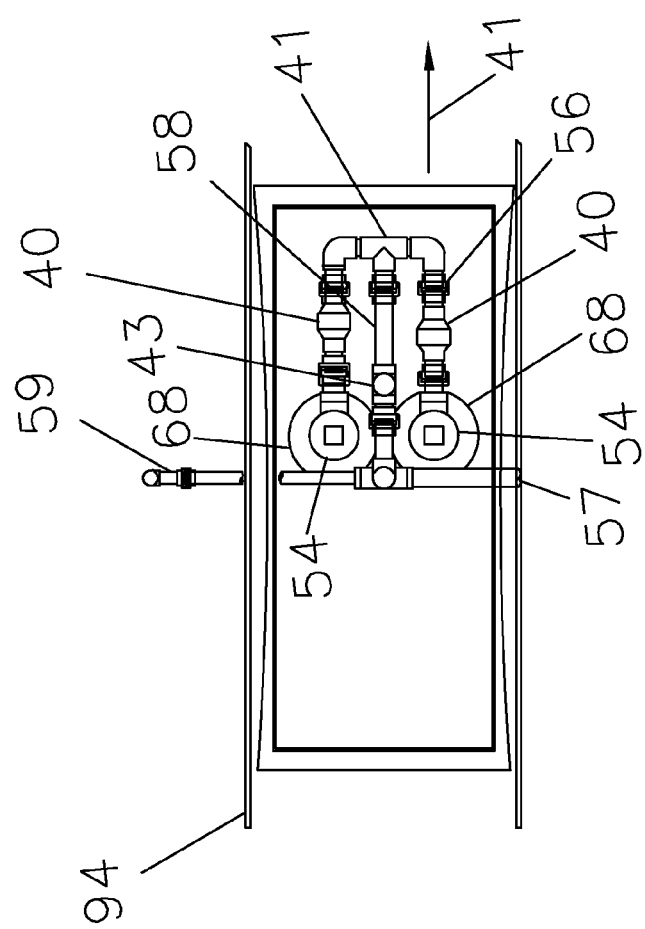
FIG. 4 is a top view of the pump section of FIG. 3.

The filtered recirculation pump flow in distribution pipe 58 is split to recirculation distribution pipe 57 and dosing distribution pipe 59 as shown in FIGS. 2 and 4. The recirculation pipe 57 and dosing pipe 59 are sized to direct an appropriate amount of flow to recirculation filter layer 26 and dosing filter layer 27, respectively, based on the filter area to be covered. The size of the recirculation filter layer 26 and dosing filter layer 27 determine the amount of recirculation flow in the system. A typical recirculation ratio is 3:1, which requires the recirculation filter layer 26 to be three times larger than the dosing filter layer 27. By varying the size of the filter areas, the amount of recirculation flow can be varied to treat different strengths of wastewater. The recirculation pump flow in the recirculation distribution pipe 57 is directed to a plurality of recirculation filter layer spray nozzles 62, which spray and distribute the wastewater over the recirculation filter layer 26. The recirculation pump flow in the dosing distribution pipe 59 is directed to dosing filter layer spray nozzle 63, which sprays and distributes the wastewater over the dosing filter layer 27. For larger systems multiple recirculation pumps 68, multiple pump filters 54, and multiple spray nozzles 62 and 63 may be used based on the treatment capacity of the system.

A recirculation basin level control sensor 70 is located in the recirculation pump chamber 38. Sensor 70 measures the water level in the recirculation chamber 28. A preferred recirculation basin level control sensor 70 is a pressure transducer. A typical pressure transducer is a submersible, stainless steel 4-20 mA output model available from Measurement Specialties, Inc. located in Hampton, Va. It is understood that other suitable level sensors may be used.

When the water level in the recirculation chamber 28 reaches a programmed minimum level above the floor 13 of recirculation chamber 28 as measured by recirculation basin level control sensor 70, control panel 16 activates one of the recirculation pumps 68 to begin pumping on a programmable time interval. The timed doses are repeated on a programmed schedule as long as the water level in the recirculation chamber 28 remains above the programmed minimum level above the floor 13 of recirculation chamber 28. The timed filter layer dosing allows a constant feeding of the bacteria and microorganisms that break down and treat the wastewater, and provides equalization storage for peak and low flow periods. Illustratively, the times doses are at fifteen minute intervals. The control panel 16 illustratively alternates between the two recirculation pumps 68.

If the water level in the recirculation chamber 28 rises above a programmed maximum level above the floor 13 of the recirculation chamber 28 as measured by recirculation basin 38 level control sensor 70, control panel 16 activates one of the recirculation pumps 68 to pump until a programmed drop in water level in recirculation chamber 28 is achieved. If the water level in recirculation chamber 28 does not drop after a programmed time or the level continues to rise, control panel 16 will signal a high recirculation chamber alarm by activating an alarm light, audio alarm and a telephone modem within control panel 16 to call and alert a service representative. The modem also illustratively notifies a responsible person in the case of a power outage and restoration, power brownout condition, recirculation chamber timer control override, recirculation pump overrun condition, septic tank high water condition, recirculation chamber high level clear, recirculation chamber override clear, recirculation chamber transducer level invalid reading, and modem test message.

When the control panel 16 activates one of the recirculation pumps 62, the flow switch 43 in distribution pipe 50 detects fluid flow. Flow switch 43 sends a signal to control panel 16 indicating that flow has begun. If the control panel 16 does not receive the signal from flow switch 43, the control panel 16 assumes a pump failure and activates the other recirculation pump 68.

The wastewater sprayed from nozzles 62 and 63 is aerated in an air space 66 located above filter layers 26 and 27. The wastewater then flows through the recirculation filter layer 26 and dosing filter layer 27 by gravity. As the wastewater flows through the filter media 52, it is treated by a combination of physical, chemical and aerobic biological processes. A preferred filter media 52 is textile chips. Illustratively, the filter media 52 is a non-woven textile fabric composed of polyethylene filaments such as Type 4-17PE textile chips available from Texel, Inc. located in Quebec, Canada.

The treated effluent from recirculation filter layer 26 flows through the porous recirculation filter underdrain 50 and falls back into the recirculation basin 28. The underdrain 50 is illustratively a fiberglass grating, perforated precast concrete or a material of a similar design. The treated filter effluent in the recirculation basin 28 is mixed with the influent wastewater from pipe 48.

The treated effluent from dosing filter layer 27 is collected on dosing filter floor 51. As discussed above, floor 51 is illustratively a solid, unperforated, impermeable floor made of fiberglass, precast concrete or materials of a similar design. The treated effluent from dosing filter layer is collected by the perforated collection pipe 47 located on dosing filter floor 51 and directed by gravity to disposal discharge pipe 86 and then to a discharge system 90. Alternatively, filter floor 51 may be sloped to drain by gravity to disposal discharge pipe 86 and then to a discharge system 90.

A pump section riser 94 is located over the pump section 18 to provide access to the pumps and piping for maintenance. The pump section riser 94 is illustratively covered with pump section hatch 98 and is locked in place by pump section hatch lock 104. A recirculation filter layer vent 99 is illustratively a down-turned pipe with a rodent guard located over the recirculation filter layer 26. A dosing filter layer vent 102 is illustratively a down-turned pipe with a rodent guard located over the dosing filter layer 27. Both vents 99, 102 allow passive aeration of the air space 66. Alternatively, the filter layer vents may be provided with electrically driven fans or wind driven turbine units such as a Hurricane Turbine Ventilator by CSR Edmonds of Brookvale Australia to provide additional air flow. Filter section risers 96 are located over spray nozzles 62 and 63 and provide access to the spray nozzle support pipes 64, spray nozzles 62 and 63, air space 66, and filter media 52 for maintenance. The filter section risers 96 are illustratively covered with filter section cover 100. Cover 100 may be removed using filter section cover handles 106.

Figure 5:
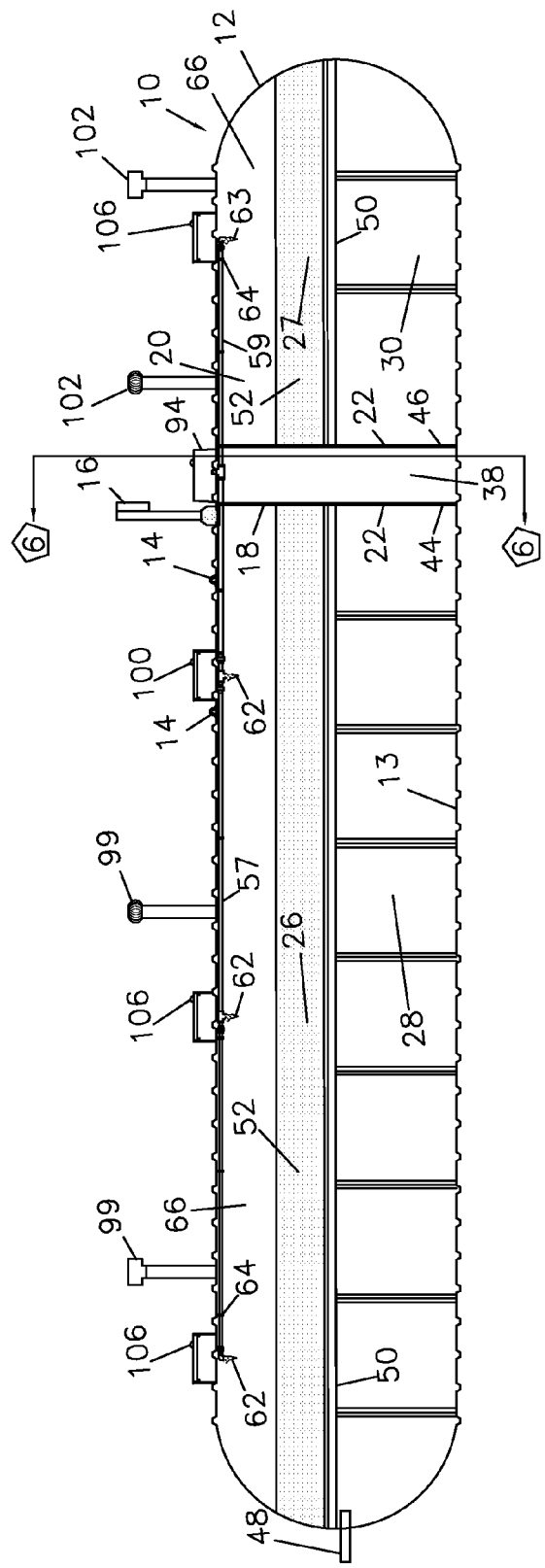
FIG. 5 is a sectional view taken through another embodiment of the wastewater treatment apparatus present invention.
Figure 6:
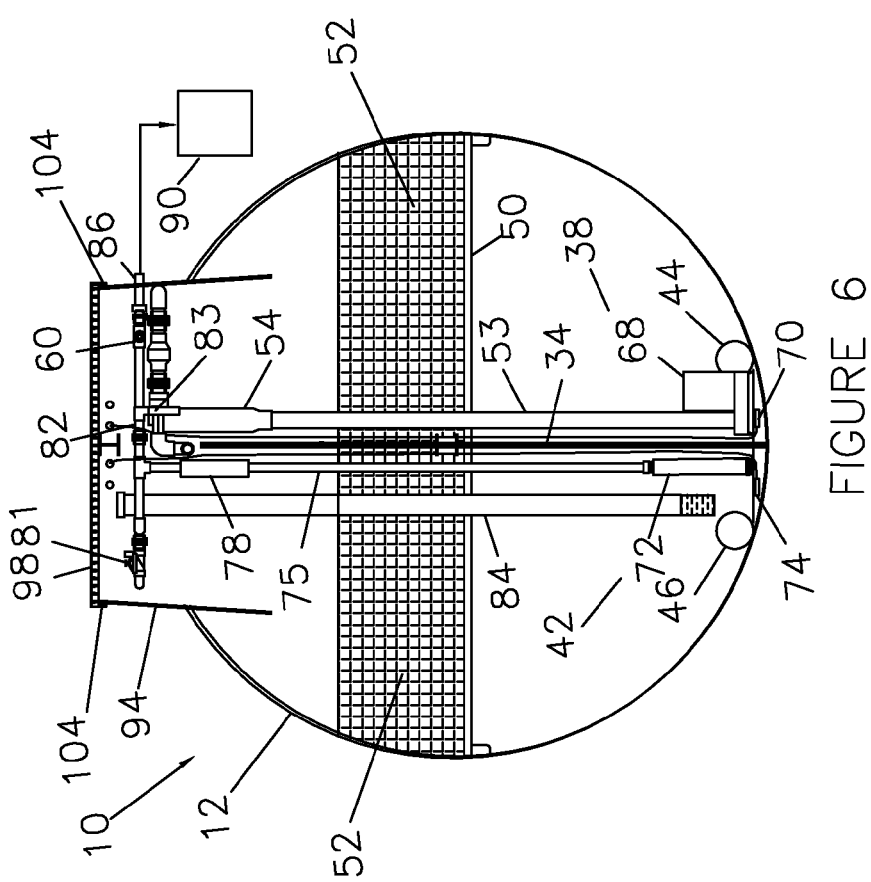
FIG. 6 is a sectional view taken along lines 6-6 of FIG. 5 illustrating a pump section of the apparatus of FIG. 5.
Figure 7:
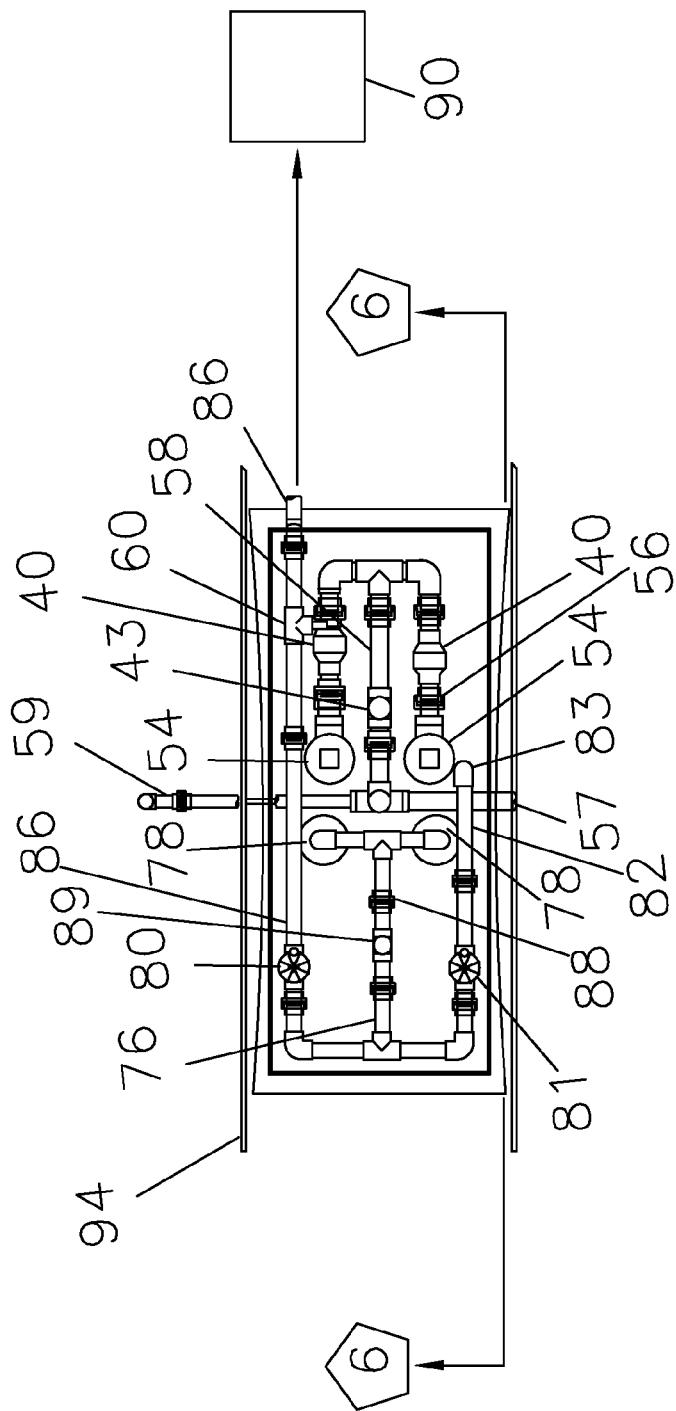
FIG. 7 is a top view of the pump section of FIG. 6.

Another embodiment of the present invention is illustrated in FIGS. 5-7. Those elements referenced by numbers the same as FIGS. 1-4 perform the same or similar function. In the embodiment of FIGS. 5-7, a porous filter underdrain 50 extends below the filter media 52 in both the recirculation filter layer 26 and the dosing filter layer 27 as best shown in FIG. 5. In other words, the treated effluent passes through the porous filter underdrain 50 due to gravity. As shown in FIG. 5, the interior region of tank 12 is divided into a recirculation chamber 28 on one side of the pump section 18 and a dosing chamber 30 on another side of pump section 18. FIG. 6 illustrates that the pump section 18 is divided by a wall 34 into a recirculation pump basin 38 and a dosing pump basin 42. Recirculation pump basin 38 is in communication with recirculation chamber 28 through conduit 44 formed in a first pump wall 22. Dosing pump basin 41 is in communication with dosing chamber 30 via conduit 46 formed in a second pump wall 22.

The filter underdrain 50 is illustratively a fiberglass grating, a perforated precast concrete or other suitable material. In the embodiment of FIGS. 5-7, the treated effluent falls back into the recirculation chamber 28 or the dosing chamber 30. The treated filter effluent in the recirculation basin 28 is mixed with the influent wastewater from pipe 48.

As discussed above, the pump section 18 is divided into two regions by wall 34. The recirculation pump basin 38 as shown in FIG. 6 includes a pair of recirculation pumps 68 which pump wastewater upwardly through pipes 53 to filters 54 as discussed above in connection with FIGS. 1-4. The entire description of the operation of fluid flow from the recirculation basin 38 is similar to that discussed above. However, in the embodiment of FIGS. 5-7, dosing pumps 72 are provided within the dosing pump basin 42. In the illustrated embodiment, a pair of dosing pumps 72 pump wastewater through pipes 75 to filters 78.

A dosing basin level control sensor 74 located in the dosing pump basin 42 measures the water level in the dosing chamber 30. A preferred dosing basin level control sensor 74 is a pressure transducer. A typical pressure transducer is a submersible, stainless steel 4-20 mA output model available from Measurement Specialties, Inc. located in Hampton, Va. It is understood that other suitable level sensors may be used.

When the water level in the dosing chamber 30 reaches a programmed minimum level above the floor 13 of the dosing chamber 30, the dosing basin level control sensor 74 signals the control panel 16 to begin pumping to the effluent discharge pipe 75 on a programmable timed basis until a programmed level of water has been removed from the dosing chamber 30. The doses will repeat on a programmed schedule as long as the water level in the dosing chamber 30 remains above the programmed minimum level above the floor of the dosing chamber 30. Control panel 16 alternates between the pair of dosing pumps 72.

If the water level in the dosing chamber 30 rises above a programmed maximum level above the floor of the dosing chamber 30, the dosing basin level control 74 signals the control panel 16 to start one of the dosing pumps 72 and pump until a programmed drop in level is achieved. If the level in the dosing basin does not drop after a programmed time or the level continues to rise, the control panel 16 will signal a high dosing chamber alarm by activating an alarm light, audio alarm and a telephone modem within control panel 16 to call and alert a service representative.

The treated filter effluent falling into the dosing chamber 30 flows through the dosing conduit 46 in the pump wall 22 into the dosing pump basin 42. The dosing pump 72 pumps the treated effluent through the effluent discharge pipe 75 into a treated effluent filter 78. A typical filter 78 is a Spin-Clean filter available from Agricultural Products, Inc. located in Ontario, Calif.

Wastewater passing through the filters 78 is coupled by a union 88 to a flow switch 89 and then to distribution pipe 76. When the control panel 16 activates one of the dosing pumps 72, the flow switch 89 in distribution pipe 76 detects fluid flow. Flow switch 89 sends a signal to control panel 16 indicating that flow has begun. If the control panel 16 does not receive the signal from flow switch 89, the control panel 16 assumes a pump failure and activates the other dosing pump 72.

Distribution pipe 76 is split into a first section coupled to a tank return pipe valve 81 and a tank return pipe 82. Return pipe 82 is coupled to an L-shaped section 83 which extends into the recirculation basin 38 as shown in FIG. 6. Distribution pipe 76 is also coupled to an effluent discharge pipe valve 80. Pipe valve 80 is coupled to disposal discharge pipe 86 having a flow sensor 60 therein. Discharge pipe 86 is coupled to a discharge system 90. In the illustrated embodiment, valves 80 and 81 are solenoid actuated valves controlled by a controller in control panel 16.

The treated effluent passing through the treated effluent filters 78 is therefore directed to either the disposal discharge pipe 86 or the tank return pipe 82. Treated effluent may also be returned to a septic tank outside tank 12 for denitrification to reduce the nitrates in the aerobically treated effluent. Denitrification occurs in the septic tank due to the lack of oxygen in the tank and the availability of organic carbon in the raw wastewater entering the tank. In the illustrated embodiment, the treated effluent is selectively directed back to the recirculation pump chamber 38 to increase the recirculation flow. The electrically actuated disposal discharge pipe valve 80 and the electrically actuated tank return pipe valve 81 are installed on the disposal discharge pipe 86 and the tank return pipe 82 to direct flow based on control inputs from control panel 16, to either outlet based on the level of treated effluent in the recirculation chamber 28 as measured by the recirculation basin level control sensor 70.

If water level in the recirculation chamber 28 is low, the tank return pipe valve 81 on the tank return pipe 82 is opened while the disposal discharge pipe valve 80 on the disposal discharge pipe 86 remains closed so that all pumped effluent is returned to the recirculation pump basin 38 during the pump dosing cycle. During normal water levels in the recirculation chamber 28, the disposal discharge pipe valve 80 and the tank return pipe valve 81 are alternatively opened and closed on each pump cycle to evenly distribute the treated effluent to the disposal discharge pipe 86 and the return pipe 82. During periods of high water level in the recirculation chamber 28, the disposal discharge pipe valve 80 on the disposal discharge pipe 86 is opened while the tank return pipe valve 81 on the tank return pipe 82 remains closed for the pump cycle so that all effluent is discharged from the treatment system. Alternatively, a single electrically actuated three-way valve may be used in place of disposal discharge pipe valve 80 and tank return pipe valve 81.

Treated effluent being discharged from the system through disposal discharge pipe 86 passes through a treated effluent flow sensor 60 prior to discharge from the system. A typical treated effluent flow sensor 60 being an F3.00.H Digiflow X3 flow sensor available from Chemline Plastics Limited located in Ontario, Canada. The treated effluent flow sensor 60 sends a signal proportional to the fluid velocity to control panel 16 which converts the signal to a flow rate and totals the flow volume on a daily basis.

An optional tablet chlorinator 84 includes a polyvinyl chloride pipe with slots located in the bottom of the pipe below the low water elevation is located in the dosing pump basin 42. The tablet chlorinator is filled with chlorine disinfectant tablets and capped at the top. The water flowing through the dosing conduit 46 when dosing pump 72 is operating moves through the slotted pipe containing the chlorine tablets and slowly dissolves the tablets while imparting a chlorine residual in the treated effluent. The chlorine residual acts to disinfect the treated effluent by killing the pathogenic organisms in the effluent. The hardness and percentage of chlorine in the tablets may be regulated to produce the proper chlorine residual in the treated effluent to provide the necessary disinfection level. The optional chlorinator should not be used if the treated effluent is being recirculated back to the septic tank or to the recirculation pump chamber. Alternately, other forms of treated effluent disinfection can be used such as ultraviolet light disinfection or ozonation.

Pump section riser 94 located over the pump section 18 provides access to the pumps and mechanical equipment for maintenance. The pump section riser 94 is covered with pump section hatch 98 and is locked in place by pump section hatch lock 104. Recirculation filter layer vent 99 is a down-turned pipe with a rodent guard located over the recirculation filter layer. Dosing filter layer vent 102 is a down-turned pipe with a rodent guard located over the dosing filter layer. Both vents allow passive aeration of the air space 66. Alternatively, the filter layer vents may be provided with electrically driven fans or wind driven turbine units such as a Hurricane Turbine Ventilator by CSR Edmonds of Brookvale Australia to provide additional air flow. Filter section risers 96 are located over spray nozzles 62 and 63 and provide access to the spray nozzle support pipes 64, spray nozzles 62 and 63, air space 66, and filter media 52 for maintenance. The filter section risers 96 are covered with filter section cover 100 and are removed using filter section cover handles 106

Although the invention has been described in detail with reference to certain illustrated embodiments, variations and modifications exist within the scope and spirit of the present invention as described and defined in the following claims.

What is claimed is:

1. A wastewater treatment apparatus comprising:
   a tank;
   a recirculation chamber located in the tank;
   a dosing chamber located in the tank, the dosing chamber having no direct fluid connection to the recirculation chamber;
   a porous filter underdrain located above the recirculation chamber and the dosing chamber;
   at least one recirculation filter layer containing a filter media, the at least one recirculation filter layer being located on the porous filter underdrain above the recirculation chamber;
   at least one dosing filter layer containing a filter media, the at least one dosing filter layer being located on the porous filter underdrain above the dosing chamber;
   an influent pipe configured to direct wastewater entering the tank into the recirculation chamber;
   at least one recirculation pump in communication with the recirculation chamber, the at least one recirculation pump pumping the wastewater from the recirculation chamber onto the recirculation and dosing filter layers, the wastewater flowing through the filter media of the recirculation and dosing filter layers, through the underdrain, and into the recirculation chamber and the dosing chamber, respectively; and
   a discharge flow control system including at least one dosing pump in communication with the dosing chamber, a treated effluent tank return pipe having a first end coupled to the at least one dosing pump and a second end in communication with the recirculation chamber, and an effluent discharge pipe coupled to the at least one dosing pump, the discharge flow control system selectively controlling flow of wastewater from the dosing chamber back to the recirculation chamber through the tank return pipe for additional treatment and through the discharge pipe out of the tank.

2. The wastewater treatment apparatus as recited in claim 1, wherein an amount of effluent treated by the recirculation filter layer and an amount of effluent treated by the dosing filter layer, respectively, is proportional to an area of the recirculation filter layer and an area of the dosing filter layer.

3. The wastewater treatment apparatus as recited in claim 1, further comprising a filter distribution pipe and at least one spray nozzle located above each of the recirculation and dosing filter layers, the recirculation pump pumping the wastewater onto the filter media of the recirculation and dosing filter layers through the filter distribution pipes and the at least one spray nozzle.

4. The wastewater treatment apparatus as recited in claim 3, further comprising a filter located in the distribution pipe to prevent debris from plugging the at least one spray nozzle.

5. The wastewater treatment apparatus as recited in claim 3, further comprising at least one vent pipe coupled to the tank, each vent pipe having an outside vent opening to atmosphere, and an opening above the recirculation and dosing filter layers to create an air space above the filter media of the recirculation and dosing filter layers, wherein the wastewater pumped through the filter distribution pipe and the at least one spray nozzle is sprayed into the air space and aerated.

6. The wastewater treatment apparatus as recited in claim 3, further comprising at least one filter section riser coupled to the tank, and a cover located on each filter section riser, the filter section riser providing access to the filter distribution pipe, the at least one spray nozzle, and the filter media for maintenance and replacement.

7. The wastewater treatment apparatus as recited in claim 1, further comprising a dosing chamber level sensor, the dosing basin level sensor activating the at least one dosing pump when the level of wastewater in the dosing chamber reaches a predetermined dosing pump activation level.

8. The wastewater treatment apparatus as recited in claim 7, further comprising a dosing pump timer, the dosing pump timer periodically activating the dosing pump, the dosing basin level sensor disabling activation of the at least one dosing pump when the level of wastewater in the dosing chamber is below a predetermined dosing chamber minimum level, and enabling activation of the at least one dosing pump when the level of wastewater in the dosing chamber is above a predetermined operating level.

9. The wastewater treatment apparatus as recited in claim 1, wherein the discharge flow control system includes a first electric valve coupled to the effluent discharge pipe and a second electric valve coupled to the tank return pipe, the first and second electric valves being controlled by the discharge flow control system to selectively discharge treated effluent to the effluent disposal system and return the treated effluent back to the recirculation chamber for further treatment.

10. The wastewater treatment apparatus as recited in claim 1, further comprising a treated effluent flow sensor coupled to the discharge disposal pipe to permit measuring and storing of flow information.

11. The wastewater treatment apparatus as recited in claim 1, further comprising a recirculation pump timer, the recirculation pump timer periodically activating the recirculation pump to dose the recirculation and dosing filter layers with wastewater on a timed basis.

12. The wastewater treatment apparatus as recited in claim 1, further comprising a recirculation basin level sensor, the recirculation basin level sensor activating the recirculation pump when the level of wastewater in the recirculation chamber reaches a predetermined recirculation chamber maximum level.

13. The wastewater treatment apparatus as recited in claim 1, further comprising first and second pump section walls located in the tank and defining a pump section therebetween, the pump section separating the recirculation chamber from the dosing chamber, and an internal wall within the pump section defining a recirculation pump basin and a dosing pump basin within the pump section, the recirculation pump basin and the recirculation chamber being connected by a recirculation conduit formed in the first pump section wall, and the dosing pump basin and the dosing pump chamber being connected by a dosing conduit formed in the second pump section wall.

14. The wastewater treatment apparatus as recited in claim 13, wherein the at least one recirculation pump is located in the recirculation pump basin, and the at least one dosing pump is located in the dosing pump basin.

15. The wastewater treatment apparatus as recited in claim 1, further comprising a control system having an alarm, the control system monitoring the wastewater level in the tank, the control system triggering the alarm when the wastewater level exceeds a maximum level.

16. The wastewater treatment apparatus as recited in claim 1, further comprising a control system including a recirculation basin level control, a dosing basin level control, a recirculation pump timer, a dosing pump timer, a recirculation chamber level alarm, and a dosing chamber level alarm; the recirculation pump timer periodically activating the recirculation pump; the recirculation basin level control activating the recirculation pump and the recirculation chamber level alarm when the level of wastewater in the recirculation chamber reaches a predetermined recirculation chamber maximum level; the dosing pump timer periodically activating the dosing pump; the dosing basin level control activating the dosing pump when the level of wastewater in the dosing chamber reaches a predetermined dosing pump activation level; the dosing basin level control deactivating the dosing pump when a predetermined level of wastewater has been removed from the dosing chamber; the dosing basin level control activating electric control valves to discharge the treated effluent back to the septic tank, back to the recirculation pump chamber, or to the discharge disposal based upon a predetermined level of wastewater in the recirculation chamber; the dosing basin level control activating the dosing chamber level alarm when the level of wastewater in the dosing chamber reaches a predetermined dosing chamber maximum level; the dosing basin level control disabling activation of the dosing pump by the dosing pump timer when the level of wastewater in the dosing chamber is below a predetermined dosing pump minimum level.

17. The wastewater treatment apparatus as recited in claim 16, wherein the control system includes a modem card, the modem card being activated by the recirculation chamber level alarm or the dosing chamber level alarm, the modem card, when activated, initiating a call to a programmed phone number to notify a responsible person of the recirculation chamber level alarm or the dosing chamber level alarm.

18. The wastewater treatment apparatus as recited in claim 17, wherein the modem also notifies a responsible person in the case of a power outage and restoration, power brownout condition, recirculation chamber timer control override, recirculation pump overrun condition, dosing chamber timer control override, dosing pump overrun condition, septic tank high water condition, recirculation chamber high level clear, dosing chamber high level clear, recirculation chamber override clear, dosing chamber override clear, recirculation chamber transducer level invalid reading, dosing chamber transducer level invalid reading, and modem test message.

19. The wastewater treatment apparatus as recited in claim 1, further comprising a tablet chlorinator located in the dosing chamber to provide chlorine to the treated effluent for disinfection.

\* \* \* \* \*